US00RE35994E

United States Patent [19]

Lestician

[11] E Patent Number: Re. 35,994

[45] Reissued Date of Patent: Dec. 15, 1998

[54] VARIABLE CONTROL, CURRENT SENSING BALLAST

[75] Inventor: Guy J. Lestician, Trenton, N.J.

[73] Assignee: IceCap, Inc., Hamilton, N.J.

[21] Appl. No.: 601,906

[22] Filed: Feb. 15, 1996

Related U.S. Patent Documents

Reissue of:

[64] Patent No.: 5,287,040
Issued: Feb. 15, 1994
Appl. No.: 908,986
Filed: Jul. 6, 1992

[51] Int. Cl.[6] ..... G05F 1/00

[52] U.S. Cl. ..... 315/291; 315/307; 315/278; 315/224; 315/219; 315/324; 315/205; 315/119

[58] Field of Search ..... 315/291, 307, 315/278, 224, 219, 324, 205, 119, 306, 209 R

[56] References Cited

U.S. PATENT DOCUMENTS

| | | | |
|---|---|---|---|
| 3,611,021 | 10/1971 | Wallace | 315/239 |
| 3,648,106 | 3/1972 | Engel et al. | 315/291 |
| 4,207,498 | 6/1980 | Spira et al. | 315/97 |
| 4,251,752 | 2/1981 | Stolz | 315/206 |
| 4,274,033 | 6/1981 | Nuckolls | 315/209 R |
| 4,392,087 | 7/1983 | Zansky | 315/219 |
| 4,560,908 | 12/1985 | Stupp et al. | 315/219 |
| 4,652,797 | 3/1987 | Nilssen | 315/209 R |
| 4,663,571 | 5/1987 | Luchaco et al. | 315/219 |
| 4,698,554 | 10/1987 | Stupp et al. | 315/307 |
| 4,701,671 | 10/1987 | Stupp et al. | 315/224 |
| 4,717,863 | 1/1988 | Zeiler | 315/307 |
| 4,723,098 | 2/1988 | Grubbs | 315/306 |
| 4,853,598 | 8/1989 | Kusko et al. | 315/101 |
| 4,873,471 | 10/1989 | Dean et al. | 315/308 |
| 4,876,485 | 10/1989 | Fox | 315/244 |
| 4,894,587 | 1/1990 | Jungreis et al. | 315/200 R |
| 4,904,905 | 2/1990 | Olon | 315/244 |
| 4,904,906 | 2/1990 | Atherton et al. | 315/291 |
| 4,914,356 | 4/1990 | Cockram | 315/307 |
| 4,933,612 | 6/1990 | Bonin | 315/307 |
| 4,937,502 | 6/1990 | Pro | 315/209 R |
| 4,994,718 | 2/1991 | Gordin | 315/240 |
| 4,998,045 | 3/1991 | Ruby | 315/209 R |
| 4,998,046 | 3/1991 | Lester | 315/209 R |
| 5,021,717 | 6/1991 | Nilssen | 315/324 |
| 5,039,920 | 8/1991 | Zonis | 315/291 |
| 5,055,742 | 10/1991 | Jurell et al. | 315/94 |
| 5,099,407 | 3/1992 | Thorne | 363/37 |
| 5,105,127 | 4/1992 | Lavaud et al. | 315/291 |
| 5,126,637 | 6/1992 | Watts et al. | 315/219 |
| 5,130,611 | 7/1992 | Johns | 315/224 |
| 5,140,229 | 8/1992 | Yagi et al. | 315/307 |
| 5,144,195 | 9/1992 | Konopka et al. | 315/94 |
| 5,159,244 | 10/1992 | Poulson | 315/205 |
| 5,173,643 | 12/1992 | Sullivan et al. | 315/276 |
| 5,332,970 | 7/1994 | El-Hamamsy et al. | 324/414 |

FOREIGN PATENT DOCUMENTS

| | | |
|---|---|---|
| 340 049 A1 | 11/1989 | European Pat. Off. . |
| 490 329 A1 | 6/1992 | European Pat. Off. . |
| WO 83/02537 | 7/1983 | WIPO . |

*Primary Examiner*—Robert Pascal
*Assistant Examiner*—Haissa Philogene
*Attorney, Agent, or Firm*—Pennie & Edmonds LLP

[57] ABSTRACT

The present invention is directed to an electronic ballast device for the control of gas discharge lamps. The device is comprised of a housing unit with electronic circuitry and related components. The device accepts a.c. power and rectifies it into various low d.c. voltages to power the electronic circuitry, and to one or more high d.c. voltages to supply power for the lamps. Both the low d.c. voltages and the high d.c. voltages can be supplied directly, eliminating the need to rectify a.c. power. The device switches a d.c. voltage such that a high frequency signal is generated. Because of the choice of output transformers matched to the high frequency (about 38 kHz) and the ability to change frequency slightly to achieve proper current, the device can accept various lamp sizes without modification. The ballast can also dim the lamps by increasing the frequency. The device can be remotely controlled.

20 Claims, 5 Drawing Sheets

VARIABLE CONTROL, CURRENT SENSING BALLAST

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is an electronic ballast device for controlling the power to one or more gas discharge lamps, specifically, fluorescent lamps. It is directed to the problems of present ballasts used for fluorescent lamps which waste energy through excess heat generation and which also lack control options.

The present invention is able to power any of the conventional fluorescent lamps without modification. This includes, but is not limited to standard fluorescent lamps, HO, VHO, T8, T10, and T12 lamps ranging from a two foot standard lamp to an eight foot T12.

2. Prior Art Statement

Fluorescent lamps are used extensively throughout office buildings, schools, hospitals, industrial plants for lighting, as plant grow lights for outdoor lighting, and for many other uses. The power to these lamps are controlled by ballasts which have inherent problems. While fluorescent lamps with standard ballasts and less sophisticated electronic ballasts offer some benefits over other lighting techniques, such as lower energy use for comparable light output, these ballasts still waste energy through excessive heat generation and they lack the features available with the present invention. Standard ballasts use bulky energy wasting transformers to create a high voltage, low frequency signal to excite the lamp filaments. The present invention uses a low voltage, high frequency signal to excite the filaments. Existing ballasts require specific impedance matching to a specific lamp design. The present invention can power a wide range of lamp sizes without modification.

Using the present invention, lamps will burn cooler, last longer and produce a brighter light while using less electricity. The present invention also has a more sophisticated level of control then is available from the present state of the art. It can dim the lamps, delay power-up to improve lamp life, sense when a lamp is missing or burnt out and respond accordingly by reducing power or shutting down completely, and it can be controlled remotely or by a programmable unit.

The present invention does not require that the lamp be individually matched to the ballast design. The present design can power a standard 425 ma lamp, an 800 ma HO lamp, a 1500 ma VHO lamp a T8, a T10 or a T12 lamp without modification. Prior Art requires the impedance of each lamp to be matched to the ballast in order that lamp current be limited. The present device uses the performance characteristics of the transformer at the operating frequency (typically about 38 kHz) that allows the impedance of the lamps in combination with the reactance of the transformer windings and a slight frequency change to limit lamp current.

International Patent No. WO 83/02537 uses a much lower frequency (20 kHz). While it uses the frequency characteristics of the output transformer to dim the lamp by increasing the frequency, its steady state operation is in the frequency mid-band of the transformer. This coupled with the lower frequency (transformer reactance is proportional to frequency) means that during steady state operation, the lamp load must be matched to the ballast. Each additional lamp requires an additional output transformer. Further, this design requires an additional transformer in the timing circuit.

U.S. Pat. No. 4,853,598 discloses a higher frequency device (30 kHz), but one that operates in the frequency mid-band of the output transformer. This design dims by lowering voltage and must also be tailored to match the load of each lamp.

U.S. Pat. No. 4,998,045 discloses a device which operates in the frequency mid-band of the output transformer, and dims by varying the pulse width (duty cycle) and frequency of the timing circuit. This ballast must also be matched to the load.

U.S. Pat No. 4,998,046 discloses a complex device with separate transformers for arc voltage and filament voltage. Additional lamps require extra transformer winding and additional ballast capacitors to match the new load.

While Prior Art is extensive, none of the patents disclose an electronic ballast which takes full advantage of the characteristics of the output transformer such that any size lamp can be powered without impedance matching by adding or changing components.

SUMMARY OF THE INVENTION

The present invention is directed to an electronic ballast device for the control of gas discharge lamps such as fluorescent lamps. The device is comprised of a housing unit with electronic circuitry and related components. The device accepts a.c. power and rectifies it into various low d.c. voltages to power the electronic circuitry, and by use of a doubler circuit, to one or more high d.c. voltages to supply power for the lamps.

Both the low d.c. voltages and the high d.c. voltages can be supplied directly, eliminating the need to rectify a.c. power.

The high voltage d.c. power is applied to a plurality of MOSFET's [Metal Oxide Semiconductor Field Effect Transistors] which are controlled by a Pulse Width Modulation [P.W.M.] circuit which outputs two pulse trains 180 electrical degrees out of phase with each other. The PWM circuit controls switching circuitry which switches the MOSFET's such that a high frequency output is fed into a plurality of output transformers. Power from the output side of the transformers is fed to one or more fluorescent lamps. The PWM circuit thus controls the frequency which is supplied to the lamps.

The electrical characteristics of the transformers and the impedance of the circuit are chosen so that two important features are derived. The transformer operates in its "high frequency zone" where an increase in frequency, with voltage held nearly constant, will cause a decrease in output current. This allows for the ballast to dim the lamps by increasing the frequency range. Secondly, in this region of operation the reactance values of the transformer primary windings and the transformer secondary windings become significant. Because reactance is proportional to frequency, with a steady state operating frequency of about 38 kHz, these values are large. When different lamps are installed, the impedance of the lamp becomes part of the overall impedance reflected back to the MOSFET's. As lamp current increases, the resistance of the lamp decreases allowing for a further current increase. The overall impedance of the output transformers coupled with the impedance of the lamp with a slight frequency change acts to limit the lamp current. For any of the lamp sizes installed, a different, steady-state operating point for current and frequency is achieved when voltage is held nearly constant. It is the phenomenon of the transformer characteristics at the design nominal operating frequency which allow different lamp loads to be powered without rewiring or component change.

The high frequency of the voltage applied to the lamps striking the filaments, causes the lamps to light. The present invention can din the lamps by increasing the frequency inputted to the transformers thereby causing the output current to lower while the voltage is held constant As the current decreases, the lamps dim. Thus, it can be seen that the selection of the operating frequency and corresponding frequency response of the output transformer are critical in the design of the present device.

If one or more lamps is burned out or removed, the device will sense this and either shut down completely or decrease output power to the remaining lamps as required.

The present device operates with a higher efficiency than conventional ballasts and higher than most electronic ballasts in large part because of the higher frequency and correspondingly smaller output transformers required.

The lamps operated by this device will also last longer. The combination of small constant voltage on the filaments, lower voltage between filaments and higher operating frequency cut down on filament sputtering, and lower the voltage potential at the levels of the lamp so that the phosphorus in the lamp is depleted evenly from end to end. This will increase lamp life by as much as six times.

BRIEF DESCRIPTION OF THE DRAWINGS

The present invention will be more fully understood when the present specification is taken in conjunction with the appended drawings.

DETAILED DESCRIPTION OF THE PRESENT INVENTION

Figure 1:
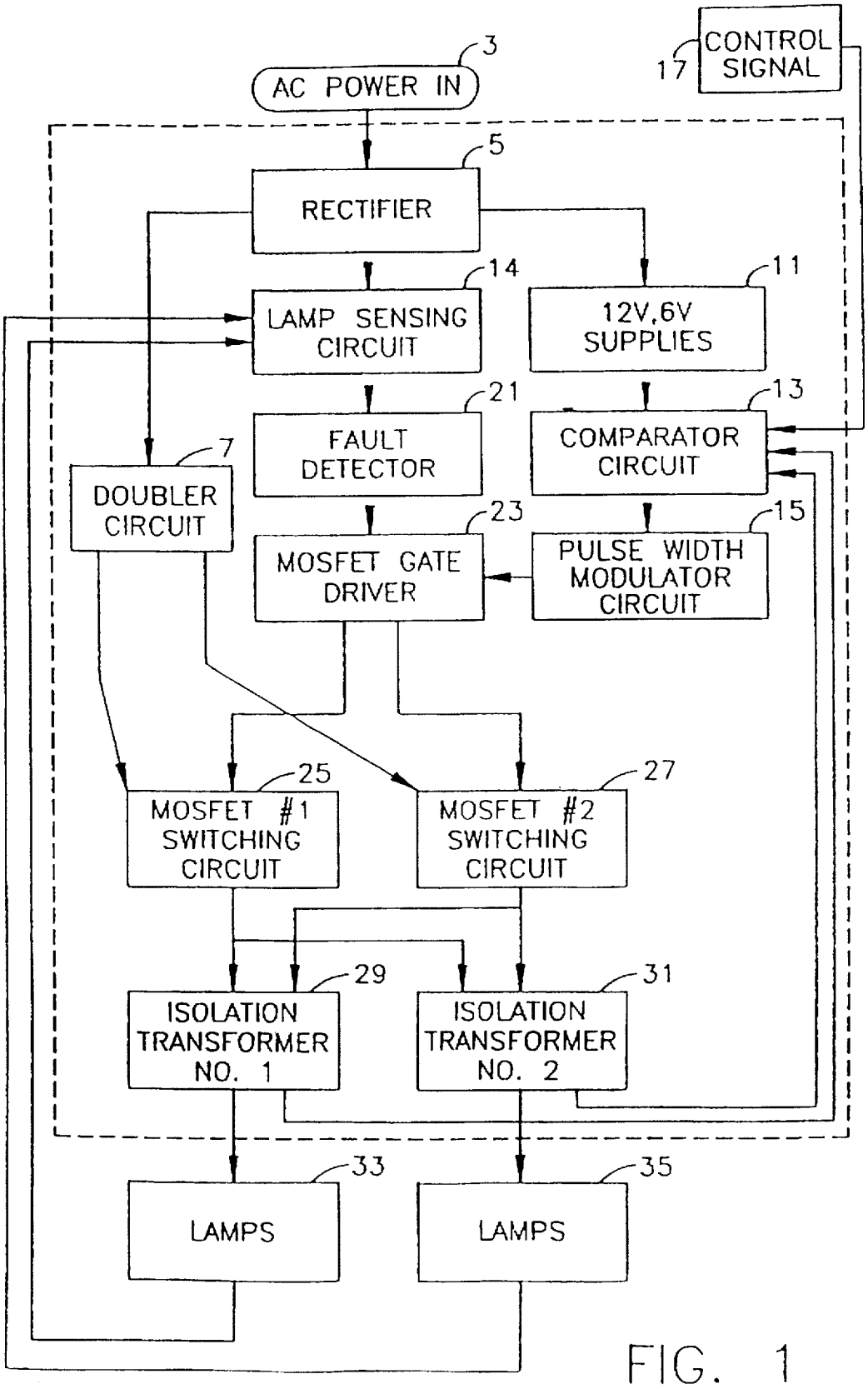
FIG. 1 illustrates a flow diagram of the electrical process of preferred embodiments of the present invention; and, FIGS. 2 (1–4) illustrate electrical schematic diagrams of one preferred embodiment ballast of the present invention showing the detailed interrelationships of the various components.

The present invention involves an electronic ballast device for controlling one or more gas discharge lamps such as a fluorescent lamp. The flow chart in FIG. 1 presents one embodiment of the present invention shown generally as frame 1.

In this configuration there is an input of a.c. power 3 by means of a neutral lead and a hot lead (120 volts in the present embodiment). The device has the means to connect to the a.c. power 3. The a.c. power is input to the rectifier section 5. The rectifier 5 performs several functions. It rectifies the a.c. power 3 into various low d.c. voltages 11 as required to power the electronic circuitry of the device 1.

The rectifier section 5 also converts the a.c. power 3 into a high voltage d.c. power. This power is converted by the rectifier 5 and doubler circuit 7 from the a.c. voltage 3 into the d.c. power voltage 7. (In the present embodiment this results in 375 volts d.c. relative to ground.)

The doubler circuit 7 supplies d.c. power and ground to two MOSFET's 25 and 27. The switching of the MOSFET's is controlled by gate driver circuitry 23 which in turn is controlled by the Pulse Width Modulated [PWM] circuit 15 in the control section described below. The MOSFET's 25 and 27 are fired alternatively between the high voltage and ground, at 180 electrical degrees apart such that a high frequency output is fed into the inputs of the two isolation transformers 29 and 31, which see a high frequency symmetrical, alternating signal relative to the neutral lead which, with filtering, approaches a sinusoidal wave.

The outputs of the isolation transformers 29 and 31 are fed to the means to connect to the fluorescent lamps 33 and 35. One or more lamps may be connected to each transformer.

There is also an output of each of the transformers, 29 and 31 which is connected to the comparator circuit 13 described below.

The comparator circuit receives an externally generated control signal 17 and compares this signal to feedback signals from the outputs of the transformers 29 and 31. The control signal can turn the device on and off or can control dimming of the lamps. The comparator circuit 13 inputs timing signals to the PWM circuit 15. This PWM circuit 15 sends the timing signals to the MOSFET gate driver 23 as described above. By controlling the firing of the MOSFET's 25 and 27, the output of the MOSFET's 25 and 27 will be a voltage wave form of variable frequency. The high frequency voltage excites the filaments of the fluorescent lamps causing them to light. By changing the frequency slightly, proper operating conditions will be achieved. By increasing the frequency, the lamps can be dimmed. By preventing the firing of the MOSFET's 25 and 27, the lamps are shut off completely.

There is a lamp sensing circuit 19 which can detect a fault. A power signal from the rectifier 5 and feedback signals from the lamps 33 and 35 are input to the lamp sensing circuit 19 which senses the current draw of the lamps. The lamp sensing circuit 19 feeds into the fault detector circuit 21 which detects when a fault occurs. A fault occurs when one or more lamps burn out or when one or more lamps are missing causing a load change thereby changing the current draw of the load. If such a fault is detected, the fault detector 21 causes the MOSFET gate driver 23 to change the signals to the MOSFET switching circuits 25 and 27 so that power to the lamps is decreased or completely shut off.

Figure 2:
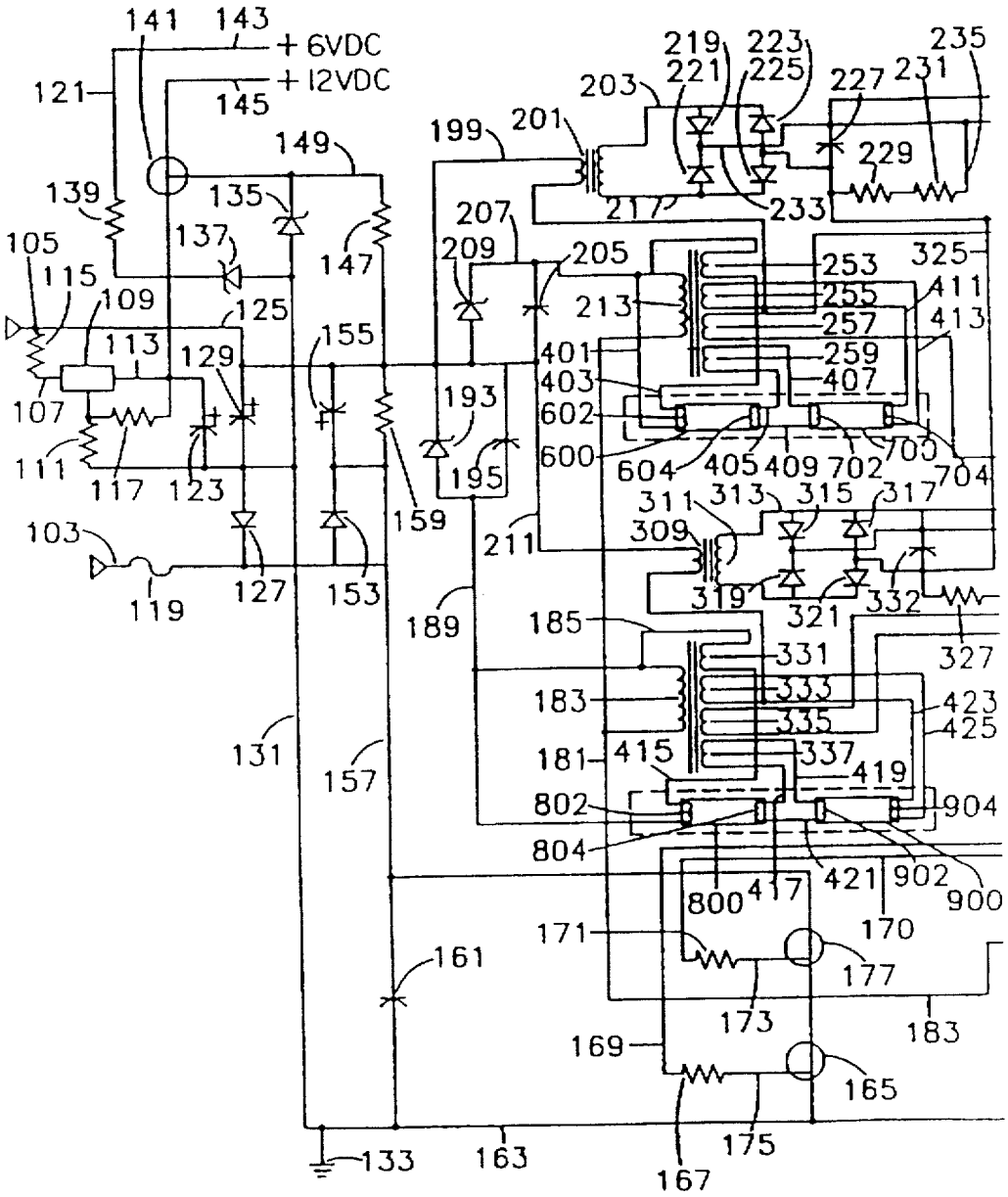
Figure 2:
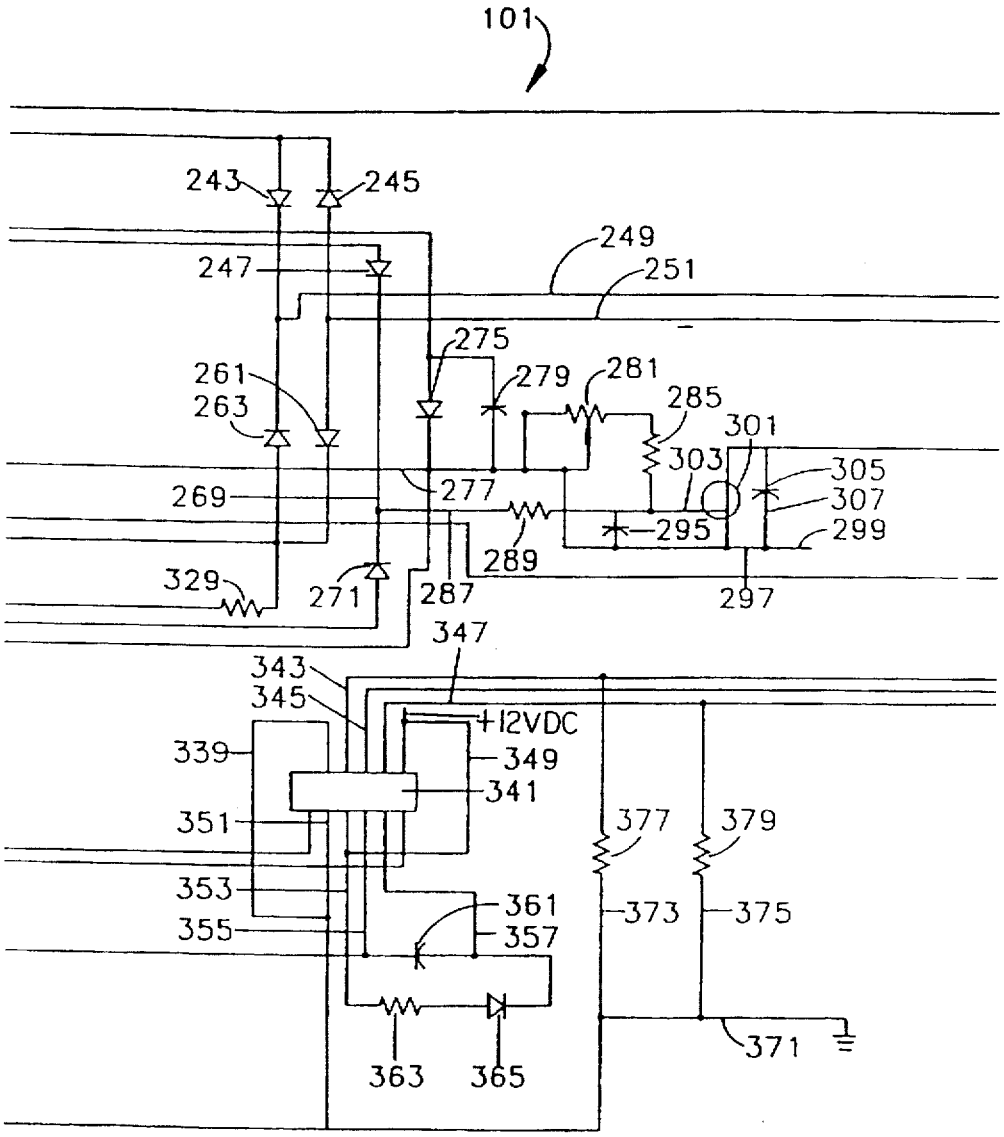
Figure 2:
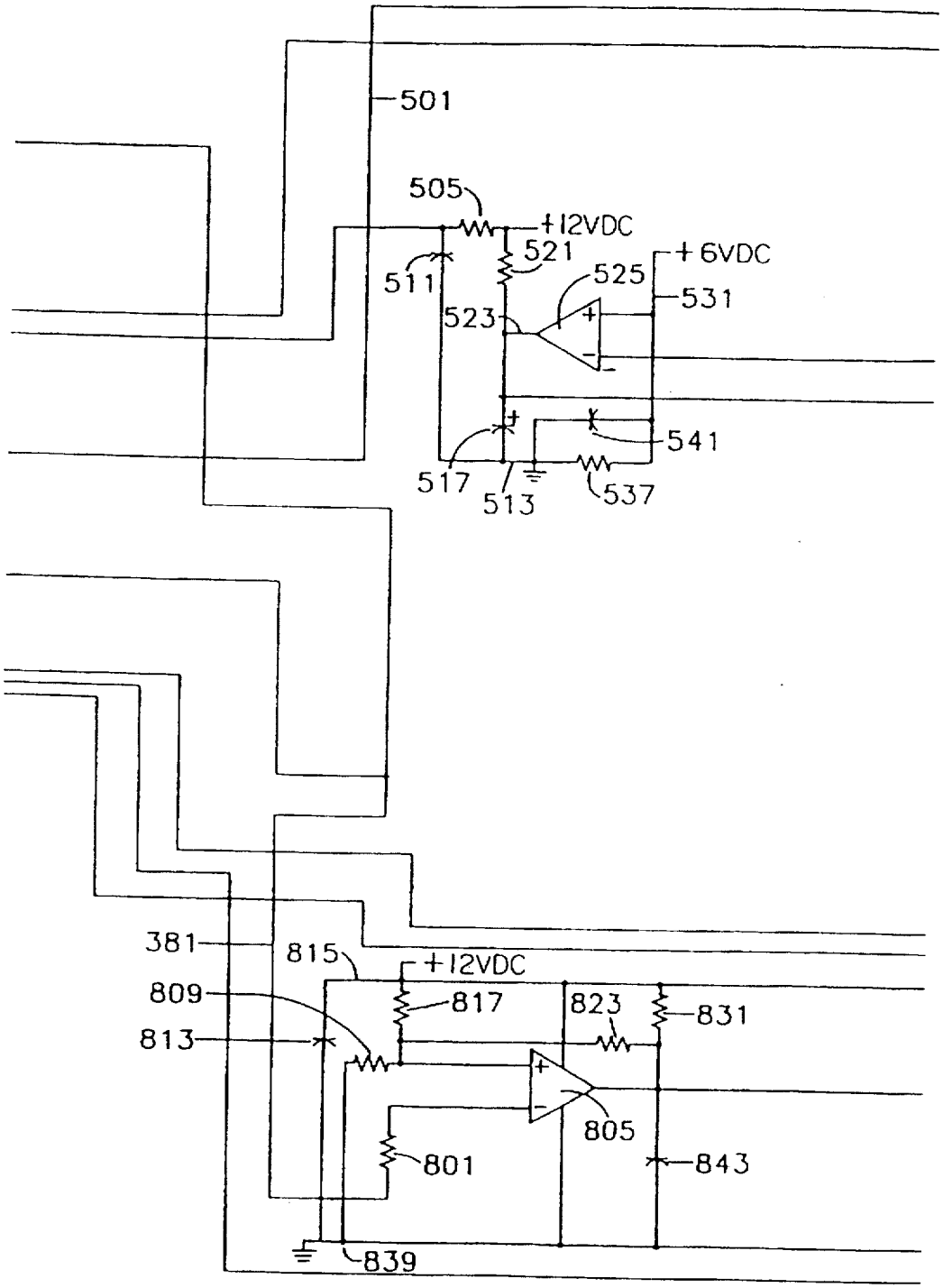
Figure 2:
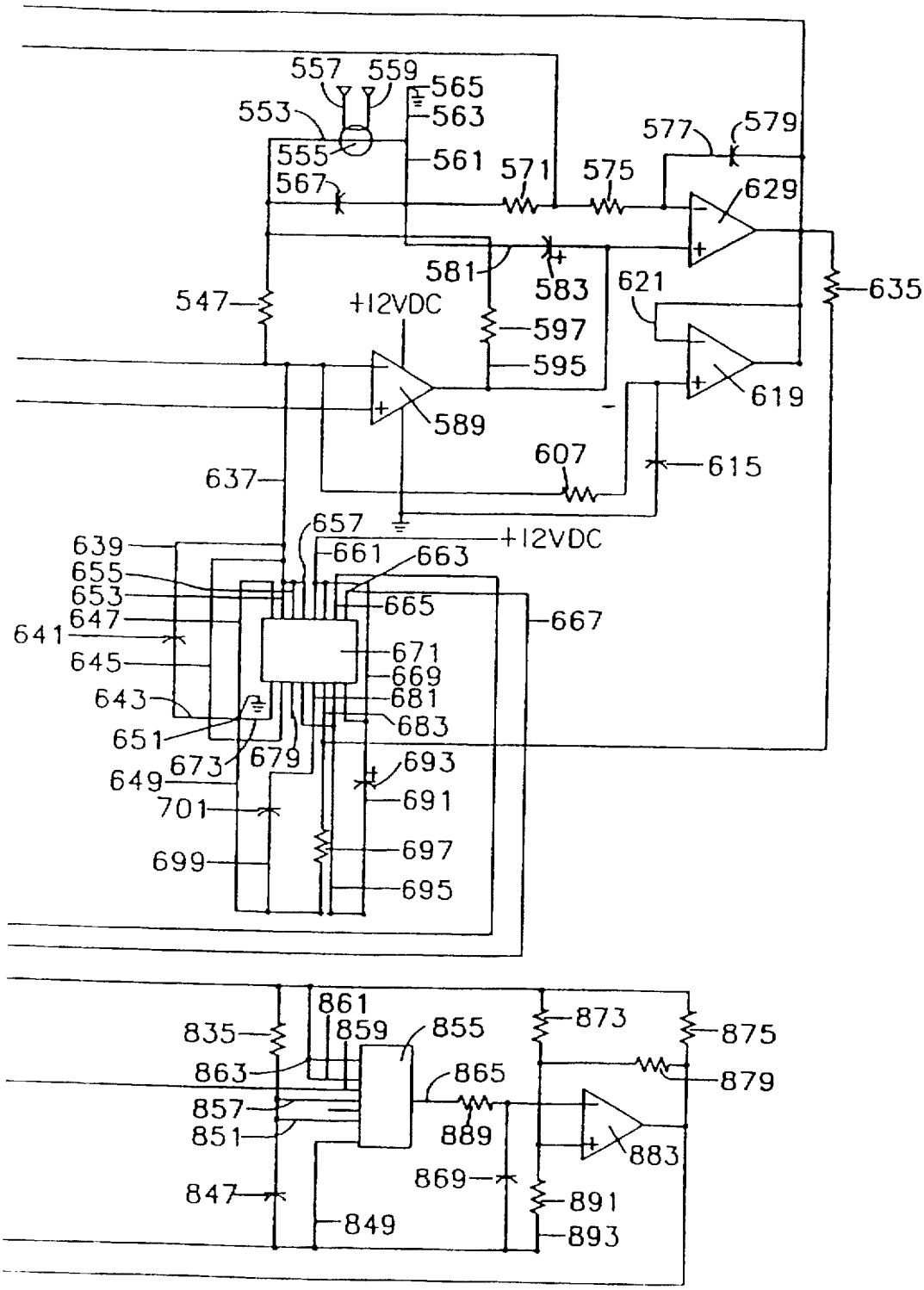

Referring now to FIG. 2, a schematic diagram 101 shows details of a preferred embodiment of the present invention. Segments 103 and 105 show the 120 V a.c. mains input. This a.c. signal is used in three ways: To supply high voltage bias to a power switching network, to be used in a 12 V power supply, and to be used as an offset voltage in the transformer network. Fuse 119 serves as an over current protection device.

The a.c. voltage is rectified by 1000 μF power capacitors 129, 155, and diodes 127 and 153. A byproduct of the rectification process is that the output voltage is doubled to approximately 325 V across wire 131 to wire 157. When 103 is positive, 153 conducts and charges 155. When 103 is negative, 105 is positive and charges 129. When 103 returns positive, 129 discharges and make the negative reference of 155 approximately 180 V d.c. Capacitor 155 charges and adds another 180 V to the negative reference, resulting in approximately 360 to 375 volts at the junction of 153 and 155 relative to the junction of 127 and 129. This voltage serves as the working voltage for the switching network to be described later. The junction of diode 127 and capacitor 129 is connected by wire 131 to ground 133 for the system. Resistor 159 (16.2 kΩ) serves as a drain device to bleed off the high voltage stored in the power capacitors 129 and 155.

The rectified voltage is stepped down through 2.5 kΩ power resistor 115 and used to derive the 12 V power supply voltage. Resistor 115, connects to voltage regulator 109 by wire 107, which regulates its output voltage to approximately 30 V using reference resistors 117 (82 Ω) and 111 (1.8 kΩ). The output voltage of 109 on wire 113 is filtered by 470 μF capacitor 123 to remove any ripple voltage. The regulator output, taken at the junction of the output pin of 109 and capacitor 123 (wire 113) is then used as bias voltage for the switching FET 141. The gate of FET 141 is connected to wire 149 which connects to 150 kΩ resistor 147 from the a.c. line 125. This drain voltage is regulated at 24 V by the zener diode 135, the zener diode 137, and 30.1 kΩ resistor 139 which steps the 24 V down to 6 V on wire 143 for use in the comparator network to be described later. The source voltage is regulated at 12 V on wire 145 for use as the voltage supply for the electronic components.

TRANSFORMERS

One side of an 85 turn primary winding 213 is oscillated in parallel with an 85 turn winding 183 of a second transformer by the switching signal at the junction of the source of MOSFET 177 and the drain of MOSFET 165. The other side of 213 is connected to the one turn scondary winding 253, the waveshaping network of .033 μF capacitor 205 and varistor 209 by wire 207, and also to filament 602 of lamp 600 by wire 401. The switching signal generated by the MOSFET network is essentially a square wave, and this signal must be conditioned before it is connected to the lamps. Capacitor 205 smooths the signal and varistor 209 protects against any overvoltage spikes, resulting in a symmetrical wave approximating a sinusoidal waveform. The secondary winding 253 on one side is connected to the primary, while the other side is connected by wire 403 to the other side of filament 602 of lamp 600. This creates a small differential voltage across filament 602. On the other side of 600, one side of the filament 604 is tied to one side of a two turn secondary winding 259. The other side of filament 602 is connected to one side of filament 702 of lamp 700. The other side of winding 259 is connected by wire 407 to the opposite side of filament 702. Secondary winding 255 (one turn) has each side connected to opposite sides of filament 704 of lamp 700 by wires 411 and 413 respectively. Thus all filaments have a small voltage across them. The side of 255 connected to 411 is also connected to the a.c. bus 125 connected by wire 199 through the center of toroid 201. This gives winding 255 an offset voltage with which to excite the lamps, so that there is a voltage between the filaments of each lamp, which is about equal to the voltage across primary winding 213.

Secondary winding 257 (one turn) acts as a current sensing device and is used as an input to one of the auxiliary lamp sensing circuits to be described later. One side of 257 passes through diode 247, while the other is connected to the ground 299 by wire 277.

The function of the second transformer mirrors the first, as they are operated in parallel. The primary winding 183 is excited by the same MOSFET switching signal as the first transformer from wire 181. Capacitor 195 (0.033 μF and Varistor 193 shape the square wave into a sinusoidal wave to wire 189 connected to winding 183.

The secondary winding 331 (one turn) on one side is connected to the primary by wire 185, while the other side is connected to the filament 802 of lamp 800 by wire 415. The primary is connected to the other side of the filament 802, which creates a small differential voltage difference across filament 802. On the other side of 800, one side of filament 804 is tied to one side of secondary winding 337 (two turn) by wire 417. The other filament is connected to filament 902 of lamp 900 by wire 421. The other side of filament 902 is connected to the ramming side of secondary winding 337 by wire 419. Secondary winding 333 has (one turn) one side connected to filament 904 of lamp 900 by wire 425 and the other connected to the other side of filament 904 by wire 423. The side of 333 connected to 425 is also connected to the rectified a.c. bus 125 connected through a jumper wire through the center of toroid 309. This gives winding 335 an offset voltage with which to excite the lamps so that there is a voltage between the filaments of each lamp, which is about equal to the voltage across primary winding 183.

Secondary 535 (one turn) acts as a current sensing device and is used as an input to one of the auxiliary lamp sensing circuits to be described later. One side of 335 passes through diode 271, while the other is connected to the ground 299 by wire 277.

FAULT DETECTOR

In the absence of a lamp load, or the presence of an excessive load, the MOSFET switching network operates in a severe overcurrent mode. This condition will persist in the initial steady state, as there are only filaments acting as a load, since the lamps are not yet ionized. Therefore, a fault detector circuit is required. The operation of the circuit is as follows.

A reference voltage is established at the high input of comparator 805 by the resistive network of 20 kΩ resistor 817 and 10 kΩ resistor 809. These resistors form the reference with a simple voltage divider using 12 V supply 815, which has been filtered by 1 μF capacitor 813 connected between 12 V 815 and ground 839. The sensing input from wire 381 passes through series 10 kΩ resistor 801 and terminates at the low input of 805. When this input is below the reference level at the high input (ie, as during a fault condition), the output of 805 is high. When the input is above the reference value (normal operating conditions), the output of 805 is low. Resistor 823 (3.3 MΩ) is used to stabilize the output of 805 against oscillation and is connected between the output pin and high input of 805. Resistor 831 (10 kΩ) serves as a pull up resistor between the output pin of 805 and the 12 V supply line. Any noise at this output is removed by the 1 μF capacitor to ground 843. Under normal operating conditions, the output of 805 will first be high, and then drop to low. This is because as the lamps are first started, they appear similar to a fault condition, and then after they are lit settle down and appear as a normal load. If the lamps fail to strike, as in a fault condition, the output of 805 will remain high.

The output of 805 is fed into the trigger input 859 of a timer chip 855. This timer chip is configured to act as a time delay one-shot circuit. The length of the delay is determined by the combination of 2.2 MΩ resistor 835 and 1 μF capacitor 847. The junction of 835 and 847 is connected to both timing pins of 855 by wires 857 and 851. The supply 863 and reset 861 pins of 855 are shortened together and tied directly to the 12 V 815 supply line. The ground pin of 855 is tied to the ground bus by wire 849.

When the output of 805 falls low, the falling edge triggers the timer of 855 to start operating. After the delay, determined by 835 and 847, the output of 855 goes high and remains high. If the output of 805 remains high, there is no falling edge, and the output of 855 remains low.

The output is buffered from the next comparator stage by the series 1 MΩ resistor 889, and any noise is removed by 1 μF capacitor 869. A reference voltage is established by equivalent 2.2 MΩ resistors 873 and 891 connected between 12 V d.c. and ground, and their junction connected to the high input of 883. The low input to 883 is taken from the junction of 889 and 869. When the input 855 is low, the output of 833 remains high, only going low when the input rises above the level determined by 873 and 891. This output is stabilized by 3.3 MΩ resistor 879 connected between the output pin and the junction of 873 and 891 which connects to the high input of 883. The last component of this section is the 499 kΩ pull up resistor 875 connected between the output of 883 and the 12 V supply line.

The output of 883 is then connected to the shutdown pin of the MOSFET driver 341 by wire 345. When this signal is high, no oscillation occurs. When the shutdown signal is low, oscillation is allowed as normal.

MOSFET GATE DRIVER

The MOSFET gate driver circuit is used to ensure proper turn on at the gates of MOSFETs 177 and 165, ie, no reverse currents and proper gate voltage.

The 12 V supply line provides power to, the gate driver 341 by wire 349. The grounding for 341 is at wire 351 which is also connected to wire 339. Wire 351 connects to wire 163 which ties to ground 133. Wires 667 and 343 are the inputs to 341 for the oscillating square wave from the pulse width modulation. In effect, 347 and 343 are two of the three control signals. As long as wire 345 (the shutdown input) remains low, these inputs will allow gate driver 341 to control the switching outputs. When a voltage is applied to wire 345 from the fault detector circuit, the outputs of gate driver 341 are disabled until the voltage at wire 345 falls to zero.

The switching outputs of gate driver 341 are found at wires 169 and 170 with wire 169 being the low side voltage switch and wire 170 being the high side voltage switch. The high side voltage is established by taking the high voltage at the source of 177 and feeding it through a bootstrap circuit consisting of 20 Ω resistor 363, diode 365, and 0.1 μF capacitor 361. The 12 V at wire 353 causes diode 365 to conduct after passing through 363. This section acts as the charging scheme for capacitor 361. Capacitor 361 is connected between wire 355 and wire 357. Capacitor 361 stores the voltage at the source of 177 and uses it as the high side switching voltage. The junction between capacitor 361 and diode 365 is connected to gate driver 341 by wire 357.

MOSFET SWITCHING CIRCUIT

MOSFETs 177 and 165 are connected in a half bridge configuration and provide the high voltage switching to operate the transformers and drive the lamps. The high voltage supply at the drain of 177 is taken from the output of the doubler circuit at the junction of 153 and 155 by wire 157. Any ripple present at this point is removed by the 0.68 μF filter capacitor 161, which is connected between the high voltage supply and ground. The gate of 177 is turned on by the high voltage output of the gate driver circuit, with 20 Ω resistor 171, connected by wire 173, acting as a buffer to reduce the gate voltage level slightly.

When the gate is turned on, the high voltage supply is switched through to the source of 177, which is connected to the drain of 165, the bootstrap circuit connected by wire 183, and the primary of transformer 213. This is the high power oscillating signal used to drive the lamps. The switching signals from 341 on wires 169 and 170 alternate 180 electrical degrees out of phase so that when 177 is on, 165 is off, so at the junction of the source of 177 and the drain of 165, the voltage is 325 V. When the gate of 177 is off, 165 turns on, making the potential at the junction equal to ground. The gate of 165 is turned on in the same fashion as 177, with 20 Ω resistor 167, connected by wire 175, acting to soften the gate turn on voltage.

PULSE WIDTH MODULATOR CIRCUIT

The pulse width modulator (PWM) circuit uses a PWM chip 671 to supply the timing signals to the MOSFET gate driver circuit, and ultimately control the frequency of MOSFET oscillation. These timing signals may be generated by other means but in this embodiment this PWM circuit supplies the alternating, high frequency timing signals.

Power for PWM 671 comes from the 12 V supply line connected by wire 661. Capacitor 693 (10 μF) acts as a local filter from the 12 V line to ground by wire 691. The 12 V supply is also connected by wires 669 and 663 to the collectors of the chip's output transistors, and this voltage simply serves as the bias voltage for them. Grounding 651 for PWM 671 is supplied by 695, which is also connected to the dead time control pin by 679, non-inverting input #1 by 673, and non-inverting input #2 by 647. The regulated reference output is connected by 655 to 657, 653, and 645. A 0.1 μF capacitor 641 is connected from 653 by 639 to ground 651 by wire 643 to smooth the d.c. voltage. This d.c. voltage serves as the inverting input for the error amplifiers of PWM 671, as well as the output control voltage. The timing for 671 is determined by the combination of 22.6 kΩ resistor 697 and 1000 pF capacitor 701 connected to ground by wire 699. Resistor 697 is connected to PWM 671 by 683 and 649 to ground, while capacitor 701 is connected from wire 681 to ground. At the junction of 697 and wire 683 is attached one side of 16.2 kΩ series resistor 635, which affects the frequency of oscillation based on the dimming signal to be described later.

The outputs of PWM 671 are taken from the emitters of the output transistors, at wires 665 and 667. These outputs are then connected to inputs of gate driver 341. Resistors 377 and 379 (10 kΩ each) are shunted across each output line respectively by wires 373 and 375, to ground 371 to stabilize the outputs locally.

LAMP SENSING CIRCUIT

The output of the toroid at 203 and 217, represent the current passing through the secondary winding 255. This is an a.c. voltage and must be rectified to d.c. Diodes 219, 221, 223 and 225 are configured in a full wave bridge rectifier formation. The full wave rectified signal is then filtered through 0.1 μF capacitor 227 to remove the ripple voltage. Capacitor 227 is connected on one side to the junction of 219 and 221, and on the other side to the junction of 223 and 225. The input to the shutdown circuit is also taken from this point, and is connected to resistor 801 by wire 381. Resistors 229 and 231 (182 Ω each) serve as a bleeder for capacitor 227 connected by wire 235. These resistors are equivalent and can be replace by one resistor equal to the sum of two. It is not critical to this embodiment that the two resistors be in series. Diode 275 and 0.1 μF capacitor 279 couple the junction of 227 and 229 to ground.

The operation of the second lamp sensing circuit mirrors the first, much as the transformer operation is the same. The outputs of the toroids, across 311, represent the current passing through the secondary winding 333. This is an a.c. voltage and must be rectified to d.c. Diodes 315, 319, 321 and 317 are configured in a full wave bridge rectifier formation. The full wave rectified signal is then filtered through 0.1 μF capacitor 332 to remove the ripple voltage. Capacitor 332 is connected on one side to the junction of 315 and 319, and on the other side to the junction of 317 and 321. This junction is connected to the junction of diodes 223 and 225 by wire 325. The input to the shutdown circuit is taken from the junction of 315 and 317 and is connected to resistor 801 by wire 381. Resistors 327 and 329 (182 Ω each) serve as a bleeder for capacitor 322. These resistors are equivalent and can be replaced by one resistor equal to the sum of two. It is not critical to this embodiment that the two resistors be in series.

The circuitry that remains in the lamp sensing circuit is not critical to the operation of the ballast. However, the extra circuitry provides alternate means to implement current sensing, fault detection, and dimming modules. The present embodiment leaves these circuits intact for development of future embodiments.

Diodes 243, 245, 262, and 263 are used to sum together the outputs of the dual toroidal full wave bridge circuits. Essentially, they act as another full wave bridge stage. The junction of 261 and 243 is connected by wire 249 to the junction of resistors 571 and 575 in the comparator network, to be described later. The junction of 245 and 263 is connected by wire 251 to the junction of resistor 505 and capacitor 511 in the comparator network.

Diode 247 passes only the positive portion of the lamp sensing signal from winding 257. This positive portion is then summed with the positive portion of winding 335, which has also passed through diode 271. The junction of 271 and 247, wire 269, which is always a positive voltage, is applied to the gate of FET 301, first passing through 16.2 kΩ resistor 289, resistor 289 being connected to the diode junction by wire 287 and so to the gate by wire 303. The voltage at the gate is divided by the resistive network of 289, 3.8 kΩ 285 and 5 k potentiometer 281. This network is used to set the turn on voltage for the gate of the FET 301 by adjusting the value of 281. Capacitor 295 (22 μF) filters out between wire 303 and ground on wire 297, which may have infiltrated the signal coming from the windings 257 and 335. Capacitor 305 (0.1 μF) serves simply to couple the drain voltage of FET 301 by wire 307, to the voltage coming from pin 1 of comparator 629 through wire 501. The source of FET 301 is connected to ground 299 by wire 297.

COMPARATOR CIRCUIT

The 6 V supply 531 derived in the power supply section here acts as a reference voltage at the high input of comparator 525. The 6 V supply 531 is filtered by 0.1 μF capacitor 541 from 531 to ground 513 and stabilized locally by 9.91 kΩ resistor 537 shunted from 531 to the ground 513. The low input gets its level from the regulated 5 V output from wire 637 in the PWM circuit. Since this comparator is in the inverting mode, the output to wire 523 will be high. The output rises slowly, as it charges 22 μF capacitor 517 connected between the output and ground 513. The speed at which the output rises is controlled by the pull up resistor 521 (45 k). The smaller the value of 521, the faster 517 will charge. Resistor 521 is connected on one side to the output of 525 and on the other side to the junction of the 12 V supply line, and to 10.7 kΩ resistor 505. Resistor 505 here works as a pull up resistor for the junction of diodes 245 and 263, whose potential is nearly ground. Capacitor 511 (0.1 μF) is connected between wire 251 and ground 513.

The output of 525 is also connected to the high input of comparator 589. The low input of 589 is taken from the regulated 5 V output of 621. The high input of 589 ramps up until it is at a higher potential than the low input. At this point, the output rises slowly, since it is charging 1 μF capacitor 583, whose positive side is connected to the output of 589 and high input of comparator 629 The negative side of capacitor 583 is connected to the ground. The output of 589 is also attached to 100 kΩ resistor 597, which connects to 10 kΩ resistor 547, 1 μF capacitor 567, and the opto isolator chip 555. These resistors are used in the dimming mode which will be discussed later.

Comparator 629 gets a high input from the output of 589. The low input comes from the junction of diodes 243 and 261, which comes into the junction of the resistors 575 (32.7 kΩ) and 571 (100 kΩ). Resistor 571 goes between the junction of diodes 243 and 261 and the ground for stability, while resistor 575 goes from this junction to the low input of 629. Also meeting at the low input of 629 is one side of 0.047 μF capacitor 579, connected by wire 577, which is connected as a feedback capacitor from the output of 629. This input is taken from the lamp sensing circuit. When the lamps are not yet lit, the signal is low, but once the lamps light, the voltage here goes high. The low input goes high faster than the high input, which is more of a slow ramp. When the voltage at the high input finally exceeds the voltage at the low input, the output of 629 goes high.

The output of 629 is connected to the output of 619, the low input of 619 by wire 621, the feedback capacitor 579, and the series resistor 635.

The high input of 619 comes from the low input of 589 through the 100 kΩ buffer resistor 607. To take out noise at this pin, 0.1 μF capacitor 615 is shunted from the high input to ground. The low input of 619 is connected to the output of 629. Comparator 619 is used to reduce the voltage present over resistor 635 at startup. When the input at the low input finally goes high as a result of comparator 629, the output of 619 then goes high also.

CONTROL SIGNAL

The control signal is supplied by an external device which outputs information to input pins of the optical isolator 555 between wires 557 and 559. This information can be used to dim the ballast, or remotely turn the device on or off. When no control signal is present, the voltage at the collector of 555 is 5 V at wire 553, since it is connected to the regulated output voltage of 671 though resistor 547. The emitter of 555 is connected to the ground 565 by wire 561. Capacitor 567, connected from the collector of 555 to the ground 563, serves as a noise filter. The control signal, in this case a dimmer signal, causes a PWM signal to appear at the collector of 555, and the pulse width of this signal varies with dimmer input. As the duty cycle decreases, and the dead time increases at the collector of 555, the lower average voltage at this point causes the voltage at the output of comparator 589 to lower, allowing 583 to drain off. As 583 drains off, the voltage at the high input of 629 decreases, which causes the voltage at the output of 629 to drop off. Resistor 635 is the timing interface device between the comparator section and the PWM section. When voltage is applied over 635, it changes the effective resistance seen at the resistive timing of 671. As this effective resistance changes, the frequency of oscillation increases and the lamps dim.

For a remote on-off controller, the input to 555 is a d.c. voltage, and this causes the collector of 555 to fall to zero volts. At this point, the same characteristics are displayed as when dimming, except instead of dimming, the ballast shuts off.

The present invention can be used to power fluorescent lamps in a wide variety of applications. It can power fluorescent lamps to provide light to aquariums, controlled by a timer. It can power lamps used to provide light for houseplants, controlled by a photocell monitoring system.

The present invention can achieve great energy savings in office buildings, schools, hospitals and industrial plants or any other location where there are large banks of lights. Not only does this type of application where there are so many lamps benefit from great energy savings, but it benefits from the ability to remotely and precisely control the output of the lamps. Also, since not all lamps in such a location will necessarily be of the same type, the user will benefit from the ability to interchange bulb types without rewiring or modification.

The present invention is also ideal for outdoor applications, lighting either areas or billboards. Because of the need to provide light for long periods in remote locations, the applications will benefit both from the energy savings of the present invention and from its ability to control the output of lamps.

Obviously, numerous modifications and variations of the present invention arc possible in light of the above teachings. It is therefore understood that within the scope of the appended claims, the invention may be practiced otherwise than as specifically described herein.

What is claimed is:

1. An electronic ballast device for controlling the power to one or more gas discharge lamps, comprising:

(a) a housing unit to mount electronic circuitry and related components;

(b) electronic circuitry mounted on said housing unit, which includes:

(i) means for connecting and applying a.c. power input to said circuitry;

(ii) means for switching lamps on and off controlling said circuitry;

(ii) rectifying circuitry to convert a.c. power input to a plurality of d.c. outputs, including one or more low voltage outputs;

(iv) comparator circuitry which receives an external control signal and compares it to feedback from the output of the device, and thereby controls a Pulse Width Modulation [PWM] circuitry;

(v) said PWM circuitry which sends at least one timing signal to MOSFET gate driver circuit;

(vi) said MOSFET gate driver circuit which receives said timing signal from PWM circuitry and supplies switching control to two MOSFET's;

(vii) said MOSFET's which receive d.c. power from doubling rectifying circuitry and which are controlled by said MOSFET gate driver circuitry such that a high frequency voltage is output;

(viii) means to create an initial delay of MOSFET switching during initial power-up to improve lamp life and effectiveness;

(ix) two isolation transformers, with the outputs of said MOSFET's connected to the inputs of said transformers;

(x) lamp sensing circuitry receiving input from rectifier to detect lamp outage, and connected to shut down circuitry;

(xii) said shut down circuitry to at least partially decrease power when at least one lamp is missing, and;

(xii) means to connect power output from isolation transformers to lamps.

2. The electronic device of claim 1, further comprising the means to be remotely controlled, for switching on and off.

3. The electronic device of claim 1, further comprising the means to remotely control the device such that the lights may be dimmed by controlling the PWM circuitry.

4. The electronic device of claim 1, further comprising the means to control the device by a programmable timer and dimmer.

5. An electronic ballast device for controlling the power to one or more gas discharge lamps, such device comprising:

(a) a housing unit to mount electronic circuitry and related components;

(b) electronic circuitry which includes:

(i) means for connecting and applying d.c. input power;

(ii) means for switching lamps on and off;

(iii) means for connecting and applying low voltage d.c. power to the electronic components;

(iv) comparator circuitry which receives an external control signal and compares it to feedback from the output of the device, and thereby controls a Pulse Width Modulation [P.W.M.] circuitry.

(v) said P.W.M. circuitry which sends at least one timing signal to the MOSFET gate driver circuit;

(vi) said MOSFET gate driver circuit, which receives said timing signal from PWM circuitry and supplies switching control to two MOSFETs;

(vii) said MOSFET's which receive high voltage d.c. power, and which are controlled by said MOSFET gate driver circuit such that a high frequency voltage is output;

(viii) means to create an initial delay of MOSFET switching during power-up to improve lamp life and effectiveness;

(ix) two isolation transformers, with the outputs of said MOSFET's connected to the inputs of said transformers;

(x) lamp sensing circuitry receiving input from rectifier to detect lamp, outage and connected to shut down circuitry;

(xi) shutdown circuitry to at least partially decrease power when at least one lamp is missing, and;

(xii) means to connect power output from isolation transformers, to lamps.

6. The electronic device of claim 5 further comprising the means to be remotely controlled, for switching on and off.

7. The electronic device of claim 5 further comprising the means to remotely control the device such that the lights may be dimmed by controlling the PWM circuitry.

8. The electronic device of claim 5 further comprising the means to control the device by a programmable timer and dimmer.

*9. An electronic ballast for controlling the power to a set of one or more gas discharge lamps, comprising:*

*(a) a switching circuit for generating a high frequency a.c. voltage;*

*(b) a waveshaping circuit for smoothing the high frequency a.c. voltage;*

*(c) at least one transformer having a primary winding and at least one secondary winding, each of the primary and secondary windings having a first end and a second end;*

*(d) wherein the switching circuit, waveshaping circuit and Primary winding are connected together in series; and*

*(e) the set of one or more gas discharge lamps and the at least one secondary winding is connected in parallel with the waveshaping circuit such that the first end of*

*said at least one secondary winding is connected to a node between the primary winding and the waveshaping circuit.*

*10. The electronic ballast of claim 9, wherein the set of one or more gas discharge lamps comprises one lamp.*

*11. The electronic ballast of claim 9, wherein the set of one or more gas discharge lamps comprises two or more lamps and connections between lamps in the set of two or more gas discharge lamps is serial and each connection is provided by one of said at least one secondary winding.*

*12. The electronic ballast of claim 9, wherein the waveshaping circuit comprises a capacitor in parallel with a varistor.*

*13. The electronic ballast of claim 11, wherein the primary winding has approximately 85 turns and each secondary winding that provides a serial connection between lamps in the set of one or more gas discharge lamps has approximately two turns.*

*14. The electronic ballast of claim 9, wherein the switching circuit comprises:*

*(a) means for connecting to an a.c. power supply at an input;*

*(b) a rectifying circuit to convert an a.c. voltage received from the a.c. power supply to a d.c. voltage; and*

*(c) a converting circuit connected to an output of the rectifying circuit for converting the d.c. voltage into a high frequency a.c. voltage.*

*15. The electronic ballast of claim 14, wherein the converting circuit comprises:*

*(a) a pulse width modulator;*

*(b) a gate driver connected to the pulse width modulator;*

*(c) a switch controlled by the gate driver for converting the d.c. voltage from the rectifying circuit into the high frequency a.c. voltage;*

*(d) wherein the pulse width modulator provides timing signals to the gate driver.*

*16. The electronic ballast of claim 15, wherein the switch comprises one or more MOSFETs.*

*17. The electronic ballast of claim 9, further comprising dimming means for controlling the frequency of the high frequency a.c. voltage.*

*18. The electronic ballast of claim 14, further comprising a lamp sensing circuit connected to one of the at least one secondary winding for detecting a current passing through the one of the at least one secondary winding.*

*19. The electronic ballast of claim 18, further comprising a shutdown circuit connected to the lamp sensing circuit for decreasing power to the set of one or more gas discharge lamps when the detected current is indicative of a lamp fault.*

*20. The electronic ballast of claim 18, further comprising a comparator circuit connected to the lamp sensing circuit, the comparator circuit receiving an external control signal and comparing the control signal to the signal received from the lamp sensing circuit and thereby controlling the pulse width modulator.*

* * * * *